US007756471B2

(12) United States Patent
Alamouti et al.

(10) Patent No.: US 7,756,471 B2
(45) Date of Patent: Jul. 13, 2010

(54) SYSTEMS AND METHODS FOR MULTI-ELEMENT ANTENNA ARRAYS WITH APERTURE CONTROL SHUTTERS

(75) Inventors: Siavash Alamouti, Hillsboro, OR (US); Alexander A. Maltsev, Nizhny Novgorod (RU); Nikolay Chistyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 618 days.

(21) Appl. No.: 11/695,003

(22) Filed: Mar. 31, 2007

(65) Prior Publication Data

US 2008/0238795 A1 Oct. 2, 2008

(51) Int. Cl.
*H04B 7/14* (2006.01)

(52) U.S. Cl. .......................... 455/19; 455/25; 455/561; 455/121; 342/154; 342/354; 342/430; 342/445; 343/751; 343/757

(58) Field of Classification Search .................. 455/19, 455/23, 25, 26.1, 561, 102, 103, 106, 107, 455/121, 162.1, 301; 342/154, 354, 357.1, 342/367, 374, 385, 423, 429, 430, 442–447, 342/435, 158; 343/721, 731, 751, 753, 757, 343/784, 783, 909, 910, 912, 913
See application file for complete search history.

(56) References Cited

U.S. PATENT DOCUMENTS

| | | | | |
|---|---|---|---|---|
| 3,878,520 | A * | 4/1975 | Wright et al. | 342/368 |
| 5,191,339 | A * | 3/1993 | Riza | 342/372 |
| 5,311,196 | A * | 5/1994 | Hanson et al. | 342/368 |
| 6,020,850 | A * | 2/2000 | Ji et al. | 342/374 |
| 2003/0193377 | A1* | 10/2003 | Quan et al. | 333/164 |
| 2006/0025897 | A1* | 2/2006 | Shostak et al. | 701/1 |
| 2008/0129475 | A1* | 6/2008 | Breed et al. | 340/438 |
| 2008/0240170 | A1* | 10/2008 | Elmala et al. | 370/517 |

OTHER PUBLICATIONS

Filipovic, Daniel F., et al., "Off-Axis Properties of Silicon and Quartz Dielectric Lens Antennas", *IEEE Transactions on Antennas and Propagation*, vol. 45, No. 5, (May 1997), 760-766 pgs.
Webb, George W., et al., "Experiments on an Optically Controlled 2-D Scanning Antenna", (1998).

* cited by examiner

*Primary Examiner*—Sujatha Sharma
(74) *Attorney, Agent, or Firm*—Schubert Osterrieder & Nickelson PLLC; Jeffrey Schubert

(57) ABSTRACT

Embodiments include systems and methods for controlling beam direction of an array of antenna elements in a wireless communications system. In one embodiment, aperture control shutters substantially cover each radiating antenna element. Each aperture control shutter is selectively turned on or off to control the direction of a beam of the antenna array.

16 Claims, 11 Drawing Sheets

SYSTEMS AND METHODS FOR MULTI-ELEMENT ANTENNA ARRAYS WITH APERTURE CONTROL SHUTTERS

FIELD

The present invention is in the field of wireless communications between a host computing system and multiple endpoint devices. More particularly, the invention is in the field of management of remote pipe resources in a wireless adapter.

BACKGROUND

"Wireless computing" is a term that has come to describe wireless communications between computing devices or between a computer and peripheral devices such as printers. For example, many computers, including tower and laptop models, have a wireless communications card that comprises a transmitter and receiver connected to an antenna. Or alternatively, a Host Wire Adapter (HWA) is connected to the computer by a USB (Universal Serial Bus) cable. The HWA has an RF (Radio Frequency) transmitter and receiver capable of communicating data in a USB-cognizable format. This enables the computer to communicate by RF transmission with a wireless network of computers and peripheral devices. The flexibility and mobility that wireless computing affords is a major reason for its commercial success.

An antenna used for wireless applications must typically be able to transmit to and receive from a variety of devices in different locations. Using state of the art technology for fabrication of antenna arrays, lenses, and reflectors, as well as semiconductor components, it is possible to fabricate inexpensive antenna systems with beam-switching capability that operate in the milli-meter (mm)-wave frequency band exhibiting shorter wavelengths. It is well known that the shorter wavelength of transmission, the higher the attenuation experienced by electromagnetic waves during propagation. Thus, propagating mm-waves suffer from very strong attenuation. Other factors such as oxygen absorption further worsen the situation making the attenuation even higher.

At mm-wave frequencies it is difficult or impossible to extend communication range by increasing transmitted power, because of difficulties implementing high power semiconductor transmitters, and because of FCC (Federal Communications Commission) limitations imposed on transmitted power. Sufficiently long communication distances can be achieved using high gain directive antennas. However, high-gain antennas have narrow beam-widths, so there is a problem of antenna alignment and accurate pointing to effectuate communication with a peripheral device. To solve the problem of antenna beam pointing, beam controlled antennas are required. Steerable beam or beam switched high-gain antennas will allow communication at sufficiently long distances and are needed for the next generation of WPAN (Wireless Personal Area Network) and WLAN (Wireless Local Area Network) mm-wave communication equipment. Traditionally, internal switching of radiators in an antenna array (for the purpose of beam direction control) is based on RF semiconductor switches, incorporated into the signal distribution circuit. A low loss and low cost signal distribution circuit required for switching of radiators is very difficult to implement at mm-wave frequencies. Thus, another method of beam steering is needed.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for controlling beam direction of an array of antenna elements in a wireless communications system. In one embodiment, aperture control shutters substantially cover each radiating antenna element. Each aperture control shutter is selectively turned on or off to control the direction of a beam of the antenna array.

The wireless communication systems described herein are intended to represent any of a wide variety of wireless systems which may include without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc.

The method of external switching of antenna array elements described herein allows antenna beam control that does not require RF switches or phase shifters in the signal distribution circuit. The method of external switching is based on specially designed devices that control the radiators by 'opening' and 'closing' them. These devices herein referred to as aperture control shutters can control radiation optically by light, for example, or by applied voltage. The aperture control shutter (ACS) can be placed directly on the radiating aperture; it has two operation modes: open and close—allowing and preventing radiation, respectively. Methods described herein provide beam switching that is easy to implement at mm-wave frequencies, and that is relatively immune to production tolerances. These methods of beam control enable the building of inexpensive, high-gain and high-efficiency switched beam antenna systems suitable for mm-wave communications.

Figure 1:
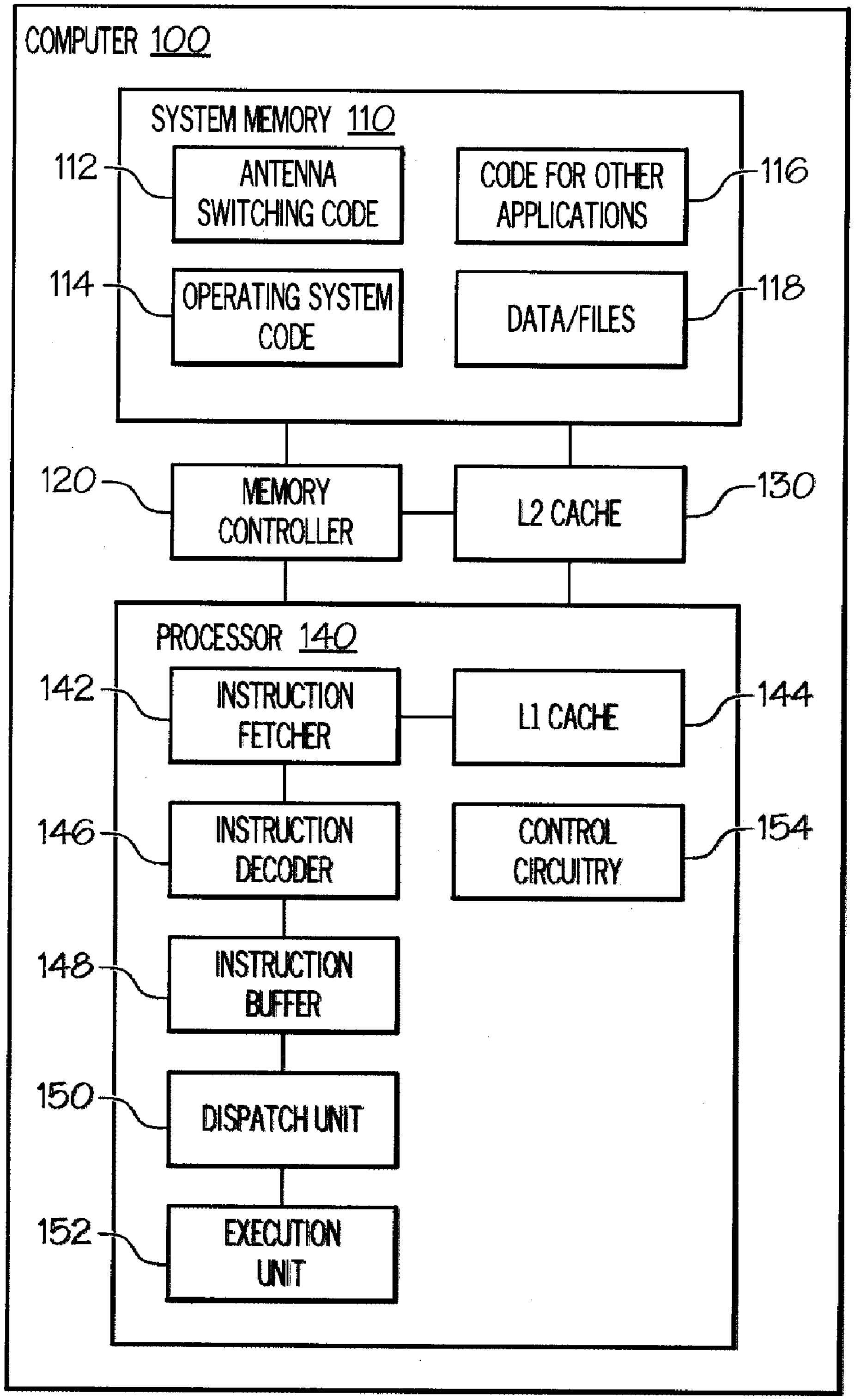
FIG. 1 depicts an embodiment of a computer to control aperture control shutters and to communicate with peripheral devices.

FIG. 1 shows view of a computer 100 of a host system to communicate with wireless devices. Computer 100 comprises a system memory 110, a memory controller 120, an L2 cache 130, and a processor 140. System memory 110 comprises a hard disk drive memory, Read-Only Memory (ROM), and Random Access Memory (RAM). System memory 110 stores Antenna aperture switching code 112, Operating System (OS) code 114, Basic Input-Output System (BIOS) code (not shown), and code for other application programs 116. System memory 110 also stores data and files 118. The antenna aperture switching code 112, OS code 114, and applications code 116, are typically stored on a hard drive, whereas BIOS code is typically stored in ROM.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level 1 cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 120 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1 also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

Figure 2:
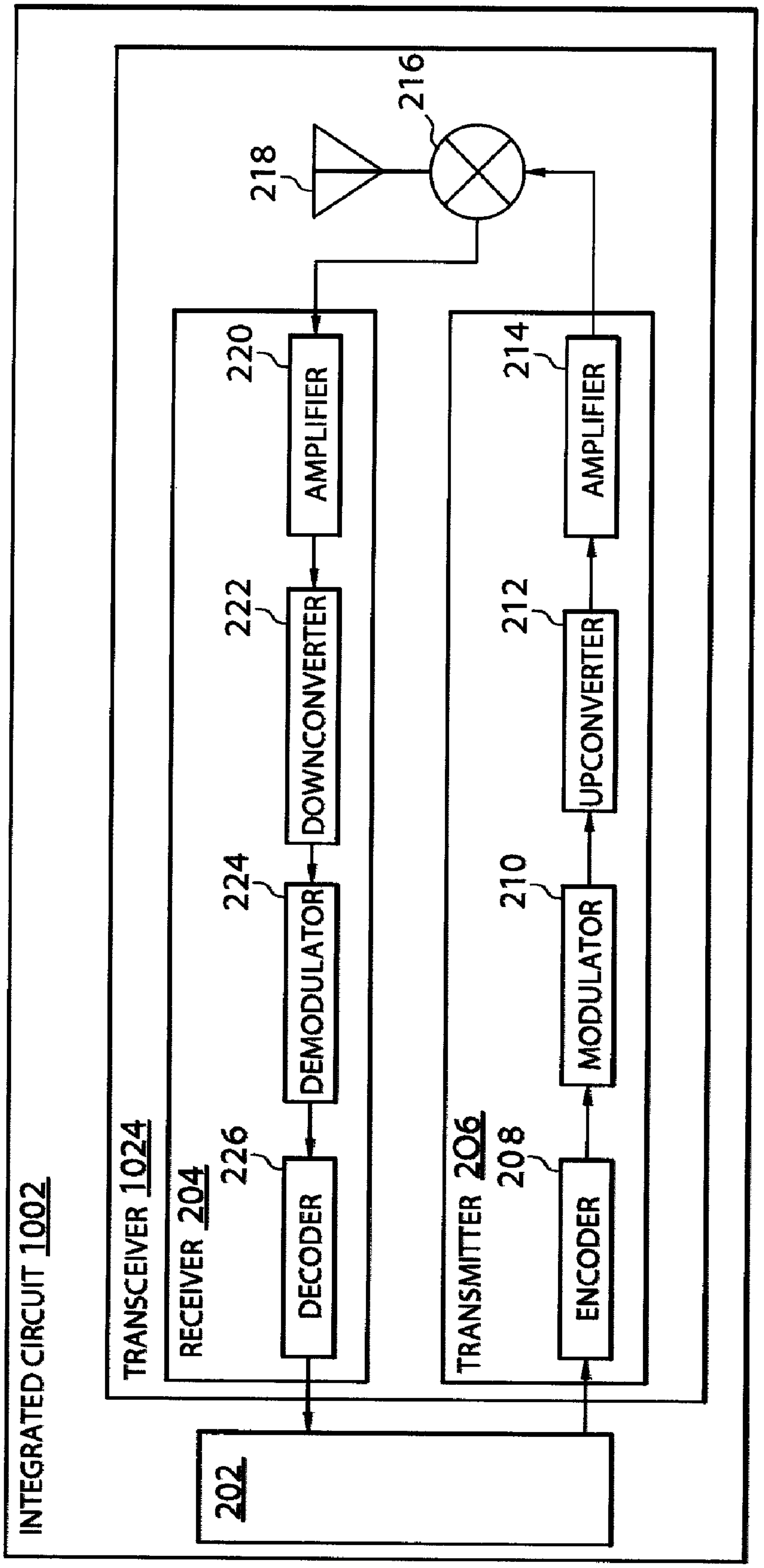
FIG. 2 depicts a transceiver in a computer-based communications system.

FIG. 2 shows an embodiment of an integrated circuit 1002 comprising a transceiver unit 1024 as may be found in a wireless computing system. Transceiver 1024 comprises a receiver 204 and a transmitter 206. An embodiment of a transmitter comprises an encoder 208, a modulator 210, an upconverter 212, and an amplification stage 214. An embodiment of a receiver comprises an amplification stage 220, a downconverter 222, a demodulator 224 and a decoder 226. Each of these components of transceiver 1024 and their functions will now be described.

Encoder 208 of transmitter 206 receives data destined for transmission from a core 202. Core 202 may comprise a computing system such as described with reference to FIG. 1. Core 202 presents data to transceiver 1024 in blocks such as bytes of data and receives data from transceiver 1024. Encoder 208 encodes the data and may introduce redundancy to the data stream. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Encryption may also be performed for security.

One type of encoding is block encoding. In block encoding, the encoder encodes a block of k information bits into corresponding blocks of n code bits, where n is greater than k. Each block of n bits from the encoder constitutes a code word in a set of $N=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon upconversion and amplification. The modulator impresses the received data blocks onto a sinusoid of a selected frequency. The output of the modulator is a band pass signal that is upconverted to a transmission frequency, amplified, and delivered to an antenna.

In one embodiment, modulator 210 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos (2πft) and sin(2πft).

In another embodiment, modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta_n=2\pi(n-1)/N$ for n a positive integer less than or equal to N. A resulting equivalent low pass signal may be represented as $$u(t)=\sum_{n=1}^{\infty} e^{j\theta_n} g(t-nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t)=\sum_{n=0}^{\infty} \exp(j\pi\Delta f t I_n)g(t-nT)$$

where $I_n$ is an odd integer up to N−1 and Δf is a unit of frequency shift. Thus, in an FSK signal, each symbol of an information sequence is mapped into one of N frequency shifts.

Persons of skill in the art will recognize that the mathematical equations discussed herein are illustrative, and that different mathematical forms may be used to represent the pertinent signals. Also, other forms of modulation that may be implemented in modulator 210 are known in the art.

The output of modulator 210 is fed to upconverter 212. A purpose of upconverter 212 is to shift the modulated waveform received from modulator 210 to a much higher frequency. Shifting the signal to a much higher frequency before transmission enables use of an antenna of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A\cos B=\frac{1}{2}[\sin(A+B)+\sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The required bandwidth of the transmitted signal depends upon the method of modulation. A bandwidth of about 10% is exemplary. The encoded, modulated, upconverted, filtered signal is passed to amplifier 214. In an embodiment, amplifier 214 provides high power amplification to drive the antenna 218. However, the power does not need to be very high to be received by receivers in close proximity to transmitter 206. Thus, one may implement a transmitter of moderate or low power output capacity. The required RF transmitter power to effectuate communications within the distances between transceiver units and an endpoint device may be varied.

FIG. 2 also shows a diplexer 216 connected to antenna system 218. The antenna system comprises an array of antenna elements for transmitting highly directive antenna beams. When transmitting, the signal from amplifier 214 passes through diplexer 216 and drives the antenna with the upconverted information-bearing signal. The diplexer prevents the signal from amplifier 214 from entering receiver 204. When receiving, an information bearing signal received by the antenna passes through diplexer 216 to deliver the signal from the antenna to receiver 204. The diplexer then prevents the received signal from entering transmitter 206. In another embodiment, separate antennas may be used for transmit and receive and a diplexer is not needed. A transmit antenna 218 radiates the information bearing signal into a time-varying, spatial distribution of electromagnetic energy that can be received by an antenna of a receiver.

FIG. 2 also shows an embodiment of a receiver 204 for receiving, demodulating, and decoding an information bearing signal. The signal is fed from antenna 218 to a low noise amplifier 220. Amplifier 220 comprises filter circuitry which passes the desired signal information and filters out noise and unwanted signals at frequencies outside the pass band of the filter circuitry. A downconverter 222 downconverts the signal at the carrier frequency to an intermediate frequency or to base band. By shifting the received signal to a lower frequency or to baseband, the function of demodulation is easier to perform. Demodulator 224 demodulates the received signal to extract the information content from the received down converted signal to produce an information signal. Decoder 226 decodes the information signal received from demodulator 224 and transmits the decoded information to core 202. Persons of skill in the art will recognize that a transceiver will comprise numerous additional components not shown in FIG. 2. Note that each endpoint device has its own transceiver which operates substantially as described above.

Figure 3B:
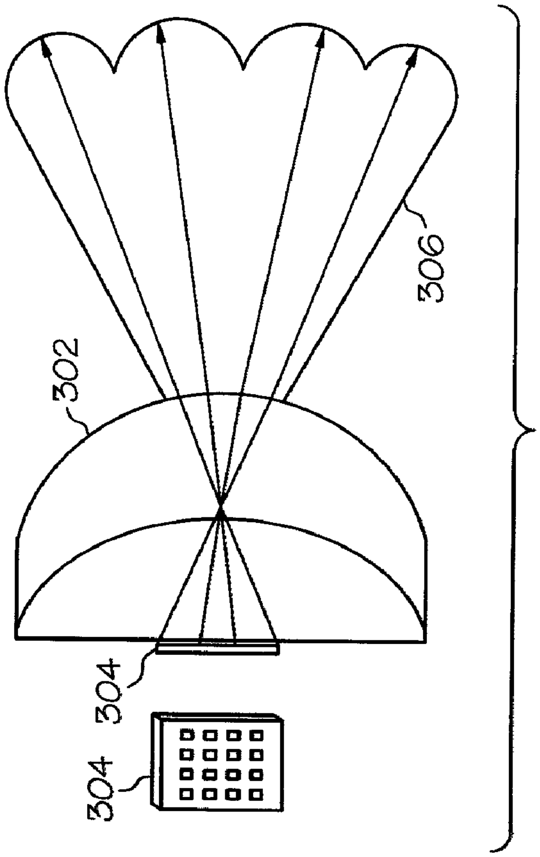
FIG. 3B (PRIOR ART)
FIG. 3A, 3B depict a prior art view of multiple beams formed by internal switching of antenna array elements
Figure 3A:
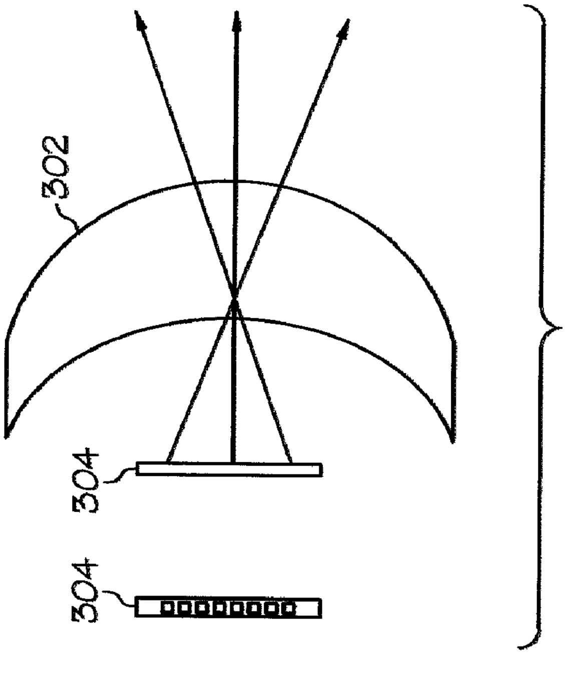
FIG. 3A (PRIOR ART)

A more detailed description of embodiments of proposed antenna systems is now provided. FIGS. 3A and 3B illustrate the well-known principle of beam switching using a lens and an array of internally switched radiating elements. FIG. 3A shows a two-surface (e.g. spherical and elliptical) lens 302 and a linear array 304 separated from the lens with an air gap. The array 304 is placed in the vicinity of the lens focal point. The direction of the beam depends on the off-axis displacement of the radiator; the larger displacement, the larger the beam tilt from the lens axis. In a typical embodiment, the lens 302 may be made of quartz, silicon, or other low loss dielectric. FIG. 3B is similar to FIG. 3A with the air gap filled. In particular, the lens and filling material can be the same. FIG. 3B shows four beams 306 corresponding to four different selection of the radiators within the antenna element array. In FIGS. 3A and 3B, only one element of the array is radiating at a time and by switching the radiating elements one by one, the beam position is switched. Thus, 3B shows the set of overlapping switched beams that determine the range of angles available for communications.

Figure 4B:
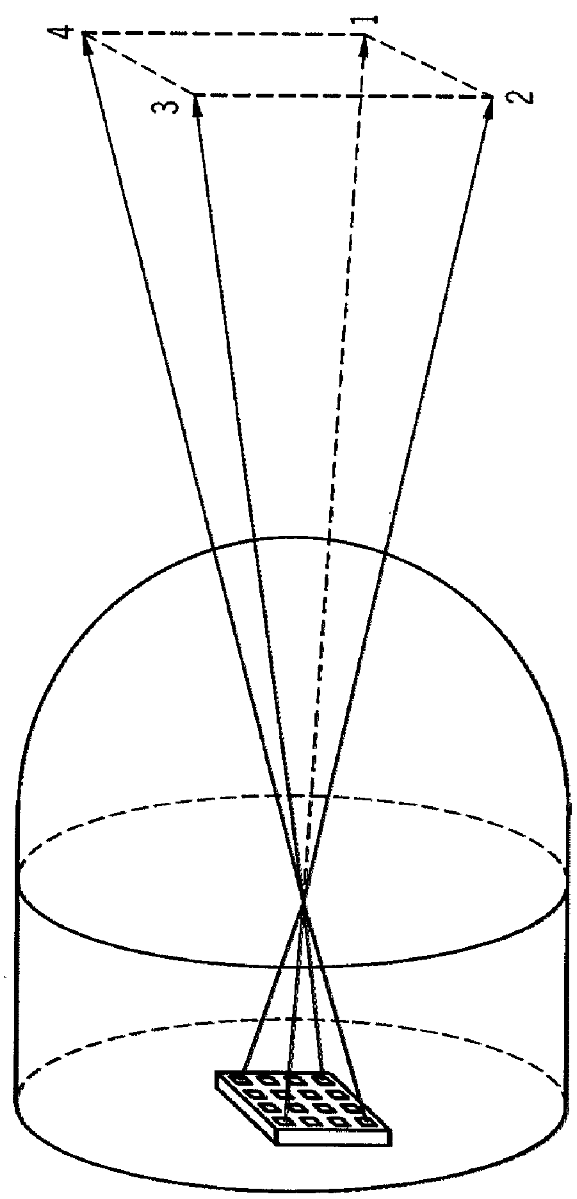
FIG. 4 depicts an embodiment of switching between 4 of 16 different beam directions using aperture control shutters
Figure 4A:
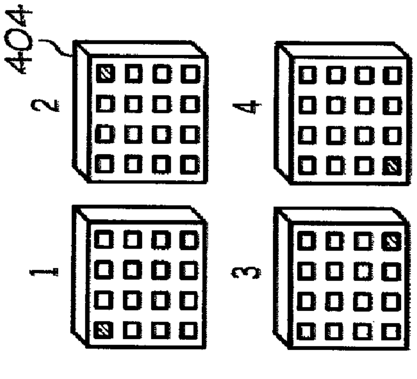

FIG. 4 illustrates the proposed method of beam switching using Aperture Control Shutters (ACSs). An array of aperture control shutters 404 is placed, as a mask, on apertures of radiating elements of a planar array. As a result, the radiators can be controlled externally (by affecting the apertures), rather than by internal semiconductor switching of the radiating elements which is difficult and more costly to implement. If some of the apertures are opened and radiate and some are closed, then a beam pattern can be selected. The apertures are selected as will be described below. The method of external switching of array elements described herein does not require switches (discrete diodes, transistors, or switches implemented as ICs) that are employed in the conventional signal distribution circuits, internally switching (ON and OFF) the signal transmission path to different antenna elements.

FIG. 4 depicts 4 different radiating configurations that can be selected one by one using ACSs to produce four differently directed beams. Thus, some embodiments comprise an array of radiators combined with ACSs and a lens. FIG. 4 reveals beam switching capability of the antenna with the array of externally switched elements using ACS's. By switching the radiating element to positions (1), (2), (3), and (4) (left part of FIG. 4), the beam is switched into positions (1), (2), (3), and (4) (right part of FIG. 4).

The antenna system may produce one beam or more than one beam at a time depending on a number of radiating elements. Lenses can be made using plastics or other low loss materials (Rexolite, quartz, Si, etc). Lenses can be made of one or more than one material. Lenses may be elliptical, extended elliptical, spherical, spherical elliptical or of other shape. Lens dimensions can be selected to meet specifications for gain or angle coverage. Being used for mm-wave communications, the antenna in the embodiment shown in FIG. 4 may have gain around 20 dBi or more, with angle coverage around ±30 degrees. Lens dimensions may range from an order of a centimeter to some 20-30 centimeters; arrays may range from 2×1 to 16×16 elements or more. The array elements can be waveguides, slots, horns, patches, dipoles, etc.

Although, the aperture control shutters can be used for beam switching in a configuration based on a lens, the scope of the invention is not limited in this respect. For example, instead of a lens a reflector can be used. Alternatively, ACS's can be used for switching sectors of a sectorized antenna array comprising phased sub-arrays.

Figure 5A:
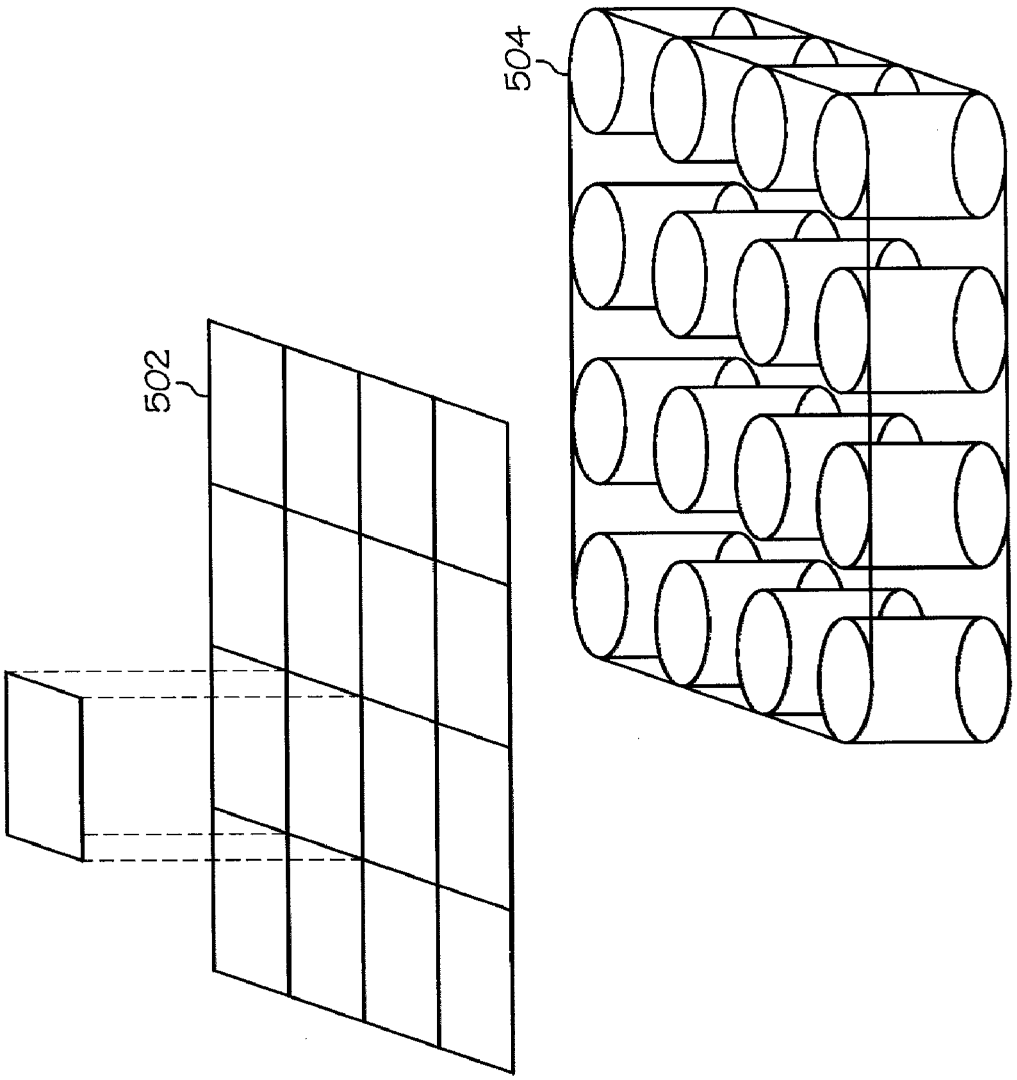
FIG. 5A depicts an embodiment of an array of waveguide elements and aperture control shutters
Figure 5B:
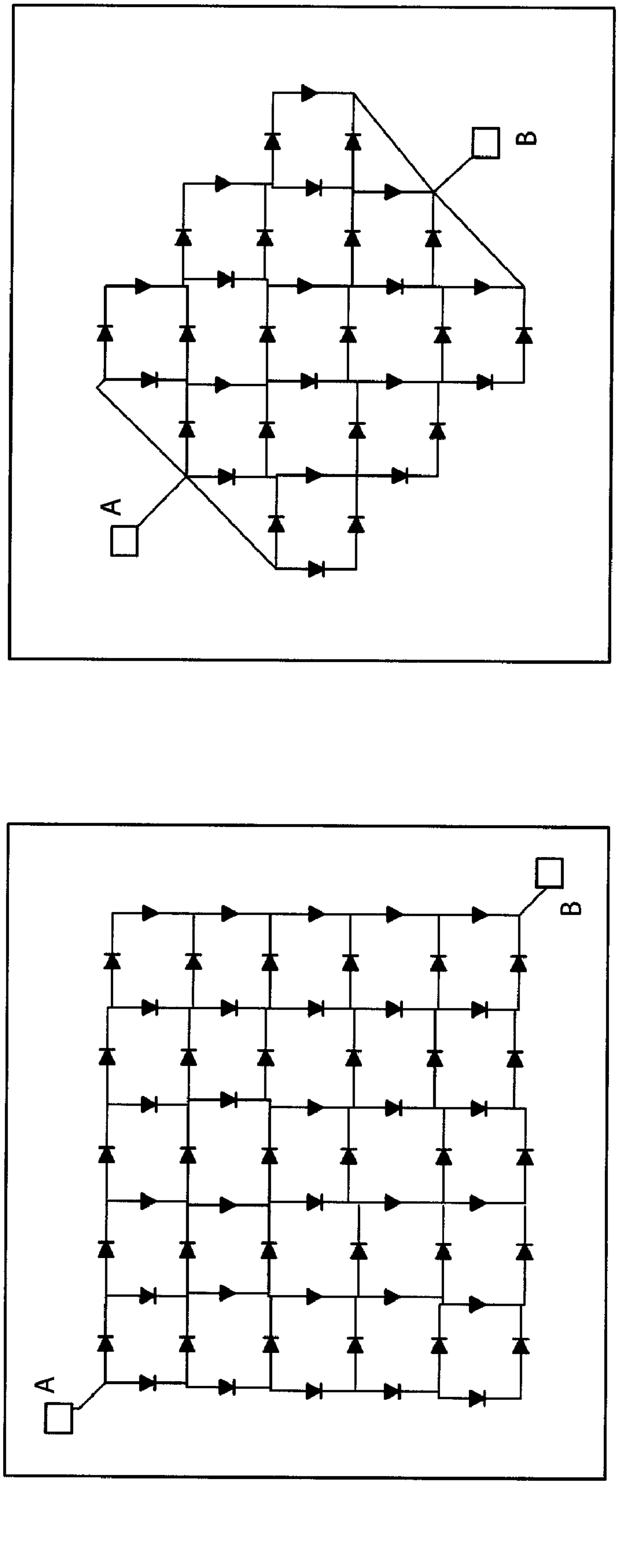
FIG. 5B depicts an embodiment of an array of diodes for aperture control shutters

FIGS. 5A and 5B show some examples of implementations of aperture control shutters. An ACS is designed for an external control of the radiating aperture so that it can be placed on the radiating aperture fully covering it or only partly overlapping with it. The ACS may be also partly inserted in the opening of an aperture of an antenna element (such as a waveguide). The ACS is designed to have two operation modes (two states): open mode to allow radiation and close mode to prevent radiation. The ACS is designed to either allow transmitting an EM-wave or fully reflecting it, without substantial absorption or dissipation of the EM-wave energy. An ideal model can be viewed in the close mode as a sheet of metal tightly pressed to the aperture of a waveguide radiator, thus, preventing radiation and totally reflecting the incident wave back. In the open mode the ACS should act as a thin dielectric slab, only slightly disturbing radiation.

FIG. 5A shows ACSs 502 placed above an array of radiating waveguides 504. An example of possible implementations of a single ACS is a thin square piece of optically controlled silicon wafer. In this embodiment, the ACS is illuminated by a light source that controls plasma density in the wafer. When light is off, the plasma density in the wafer is low; when light is on, the plasma density in the wafer is high—this corresponds to the open and close modes of the ACS, respectively. The array of ACSs put directly on the waveguide apertures together with a system of light sources (not shown) gives a controllable array for beam switching, allowing radiation from selected apertures.

FIG. 5B illustrates another embodiment of ACS implemented as a voltage controlled mesh of diodes implemented on a silicon die. When biased in a forward direction, the diodes became conductive and the structure acts as a metal grid with respect to the incident EM-wave, i.e. it will act as a conductor and therefore will reflect an incident wave. This corresponds to the closed mode of ACS operation. When biased in the reverse direction, the diodes become isolative and the structure acts as a non-conductor and, therefore, is relatively transparent to incident mm-waves. This corresponds to the open mode of ACS operation. If the aperture is large enough, the ACS may be implemented using a substrate containing a number of dies with diodes.

In another embodiment, an ACS may be implemented as a gas avalanche tube. When the tube is on, plasma in the tube will reflect mm-waves, which corresponds to the closed mode of ACS operation. When the tube is off, gas in the tube is transparent to mm-waves, which corresponds to the open mode of ACS operation. Another embodiment combines an optically controlled ACS with a patch antenna array. An optically controlled silicon wafer is placed on the radiating patch. The patch to feed-line matching and mismatching is controlled by switching the illumination ON and OFF. An ACS based on a photoconductive wafer can be specially designed to provide radiation when it is illuminated and to stop radiation otherwise. For example, the geometry of a patch antenna can be designed to radiate when the associated ACS is illuminated, and cease to radiate because of mismatch when the light fails.

An ACS based on a photoconductive wafer can be specially designed to provide radiation when it is illuminated and to stop radiation otherwise. For example, the geometry of a patch antenna can be designed to radiate when an associated ACS is illuminated, and to cease to radiate because of a mismatch when the light fails.

For good repeatability and insensitivity to tolerances, an ACS should be relatively insensitive to its displacement across the aperture. For example, because of homogeneity, the position of a piece of optically controlled wafer on the waveguide is not critical for waveguide performance and can be slightly shifted in the aperture plane. Note that in this respect, a single photo diode may not function as a proper ACS, if used in conjunction with the patch antenna, as being sensitive to its location on the aperture, but a piece of optically controlled wafer or a semiconductor die containing a mesh of diodes can be considerably less sensitive to small deviations in its position.

Figure 6:
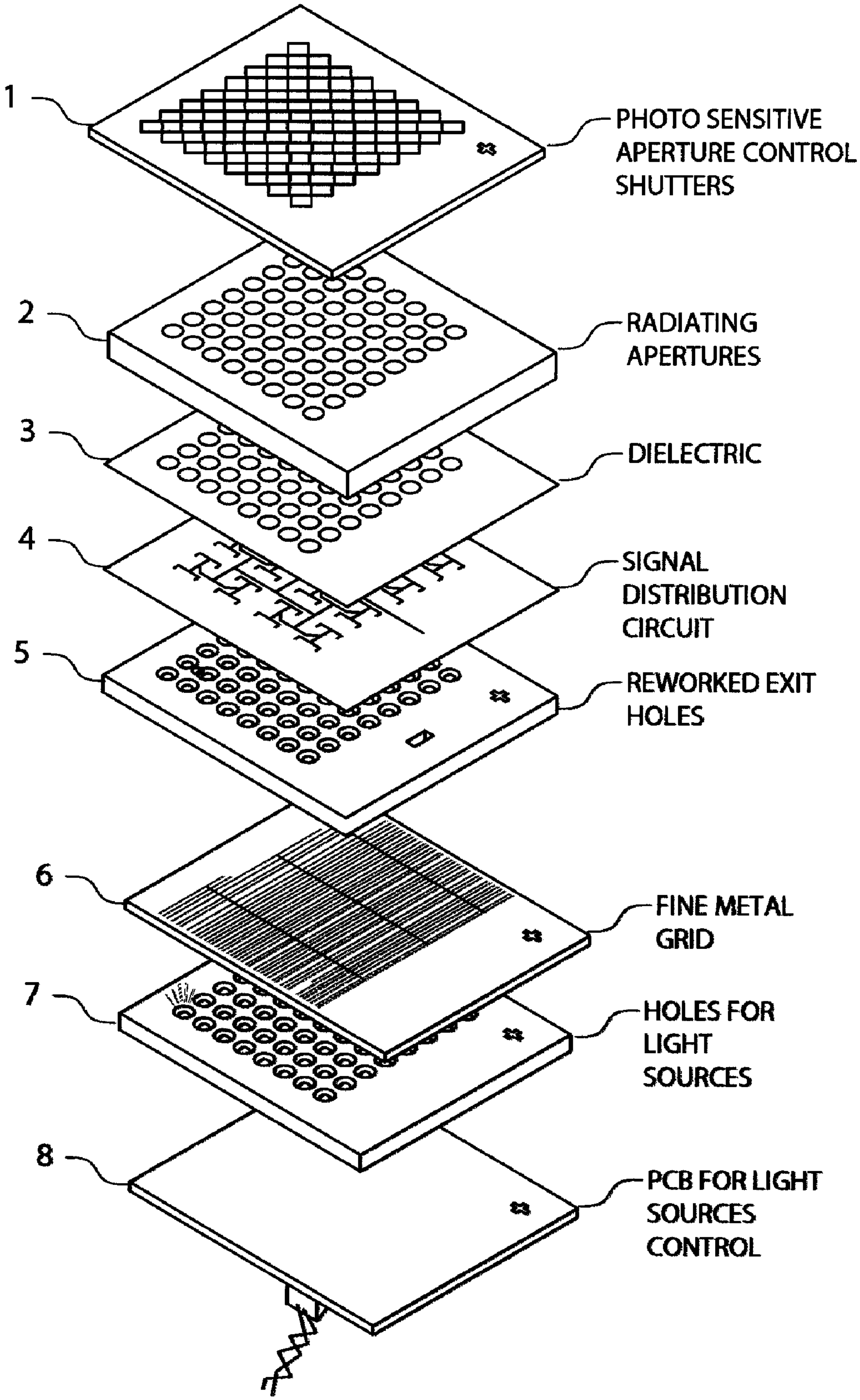
FIG. 6 depicts an embodiment for assembly of an array with optically controlled aperture control shutters

FIG. 6 shows an assembly of an embodiment of an antenna array with ACSs. In the illustrated assembly, a Printed Circuit Board (PCB) (8) is provided to control light sources embedded thereon. A protective plate (7) is provided with holes to allow light to pass there through. Above plate 7 is a light transparent metal grid (6). This is followed by another plate (5) with through holes. The next three components (plates 2, 3, and 4) form the antenna array elements comprising a signal distribution circuit, a dielectric layer, and a layer with radiating apertures. Finally, a plate comprising photo-sensitive apertures (1) is placed on top. Thus, existing planar fabrication technology can be employed. Or alternatively, components may be placed on curved surfaces to increase angular coverage. Also, the apertures may be of any shape including, circles, rectangles, triangles, etc.

Figure 7A:
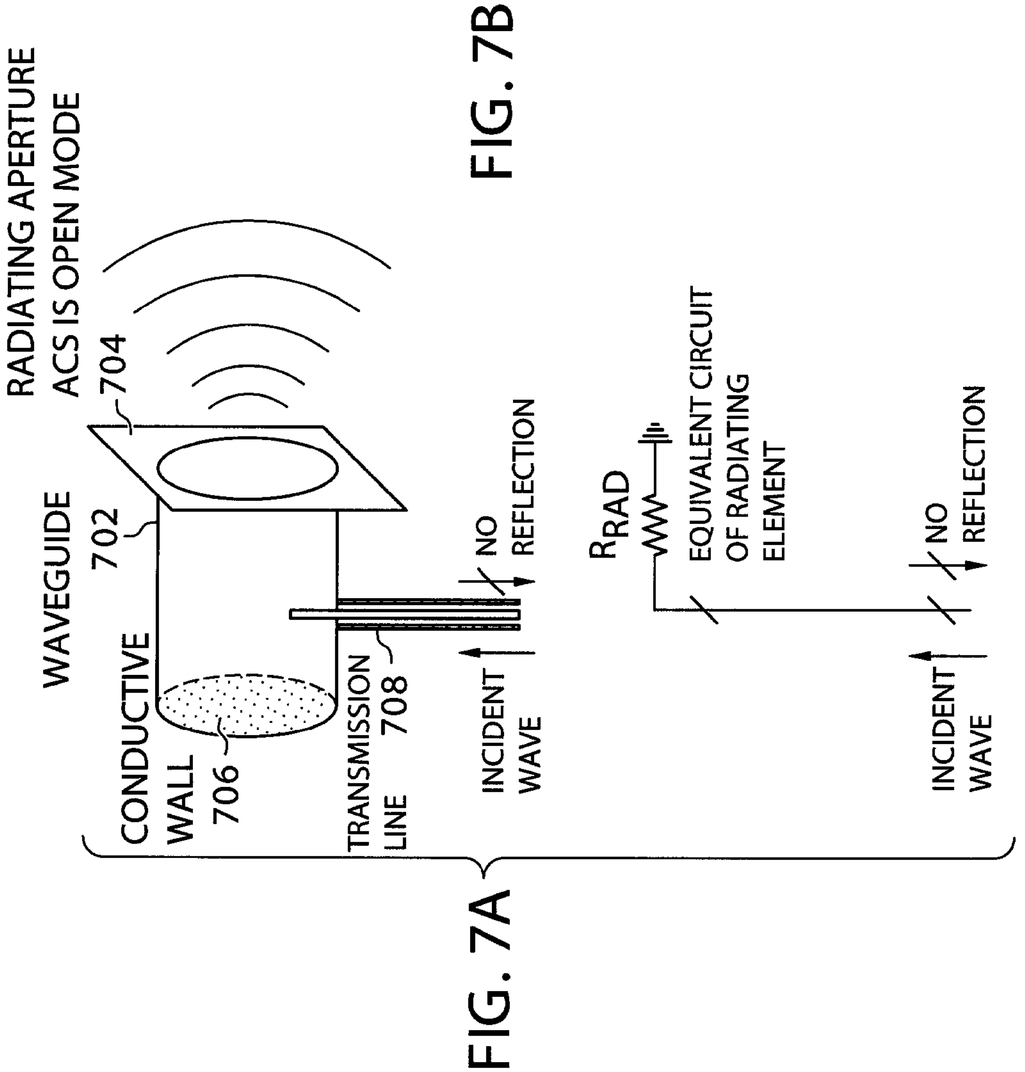
FIG. 7A, 7B depict a waveguide element and equivalent circuit for an open shutter and a closed shutter
Figure 7B:
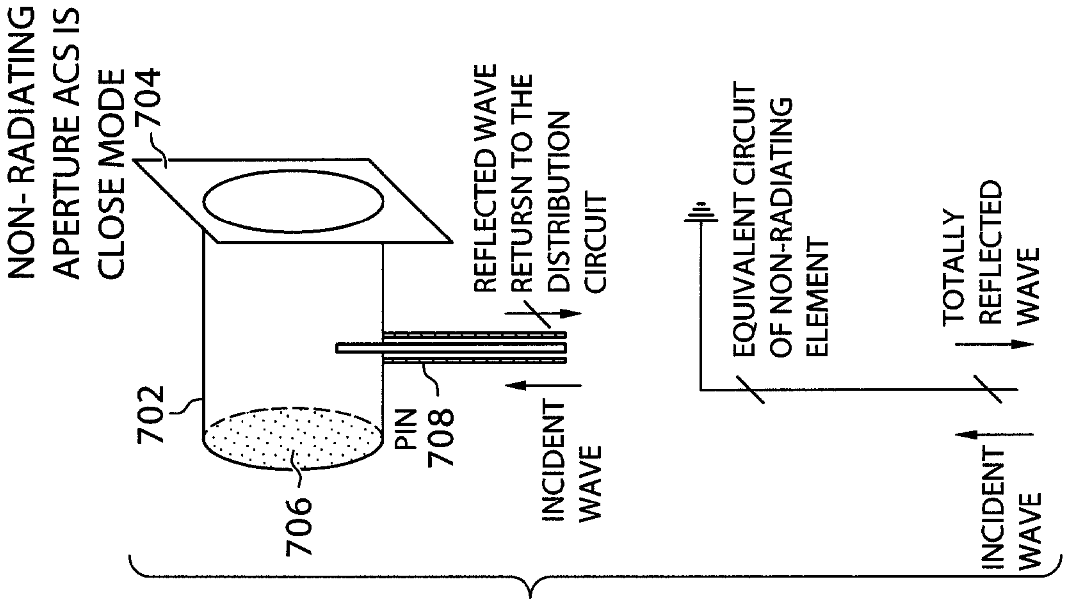

FIG. 7A and 7B show operation of a waveguide radiating element in conjunction with an ACS. FIG. 7A shows operation in the open (radiating) mode and FIG. 7B shows operation in the closed (non-radiating) mode. The radiating element comprises, in this example, a circular waveguide 702 that is closed on one end 706 by a conducting wall. On the opposite end is an ACS 704. The waveguide is excited by the inner conductor of a transmission line 708 that extends into the waveguide. In the radiating mode, FIG. 7A, an incident wave travels into the waveguide and radiates while encountering a resistance of radiation, Rrad. In the non-radiating mode, FIG. 7B, with the shutter closed, the incident wave is reflected back down the transmission line and the waveguide appears as a short circuit.

Figure 8:
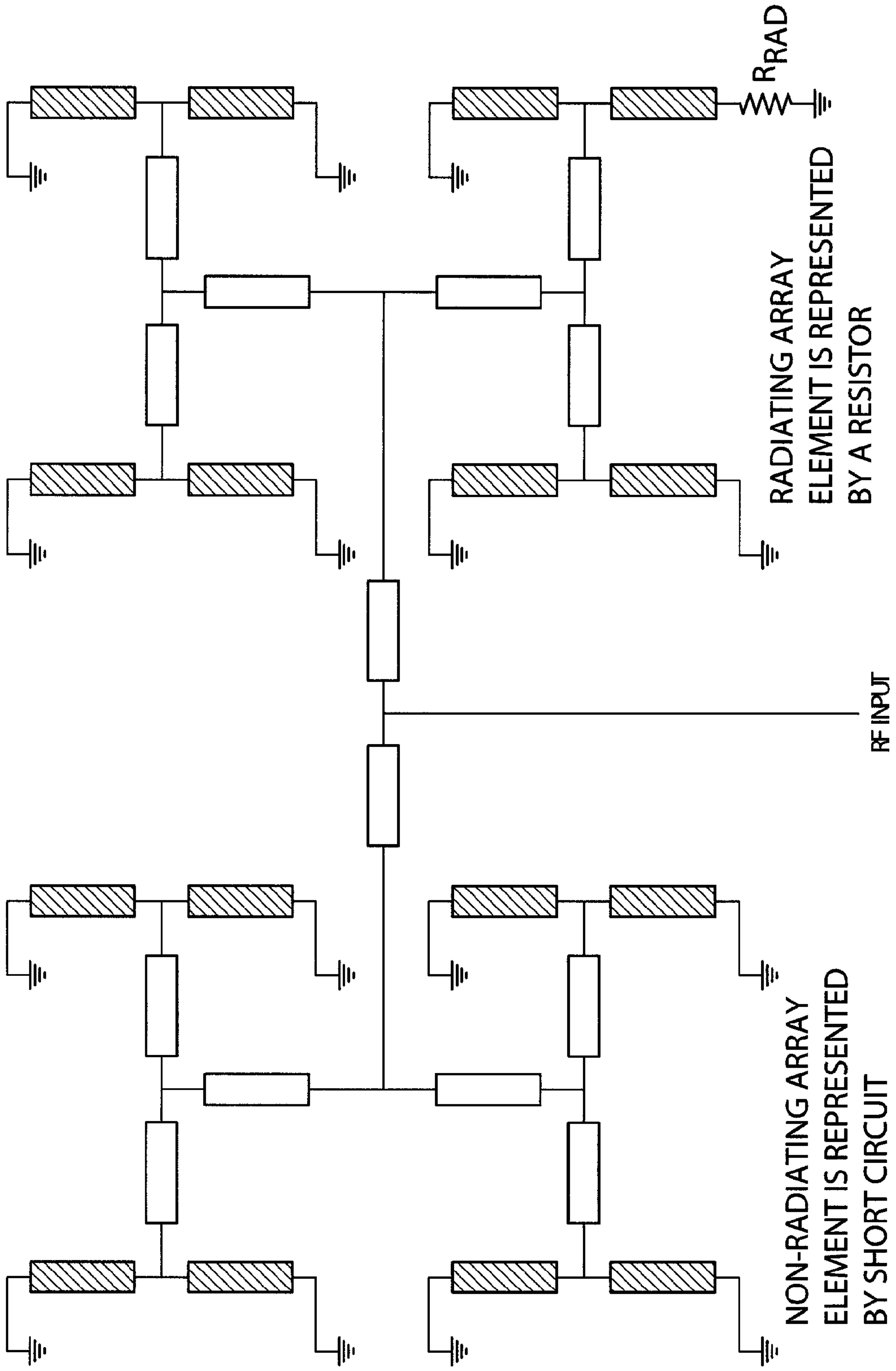
FIG. 8 depicts an equivalent circuit of a 4 by 4 element antenna array with one shutter opened.

FIG. 8 shows an embodiment of a signal distribution circuit that may be used for a 4×4-element array of radiators. The signal distribution circuit is composed of transmission lines (shown as rectangles colored in grey and in white); the characteristic impedance of each line is equal to the input impedance (Rrad) of the radiator with the ACS in the open mode. The lengths of the transmission lines are $(2n-1)*\lambda/4$ (grey) and $m*\lambda/2$ (white), where n, m are integer numbers and $\lambda$ is wavelength in the line. In FIG. 8 only one element of the array of 16 elements is radiating, which is presented by resistor Rrad; other elements do not radiate and are represented by short circuits. Using ACS, the radiating element of the array may be changed, and any selected one or more may radiate, while the other elements are closed (do not radiate).

Changing the radiating elements does not affect input impedance of the whole array, because of the circuit being symmetric and the line lengths selection. As is well known, a line of length $(2n-1)*\lambda/4$ terminated by a short circuit will exhibit infinitively high impedance at the other end. And a line of length $m*\lambda/2$ terminated with arbitrary impedance will exhibit the same impedance at the other end. Therefore, all short circuits in FIG. 8 will not affect the input impedance of the antenna, which will remain equal to Rrad, regardless of which element of the array is radiating at the moment. In some other embodiments, more than one element may radiate simultaneously and elements may be switched in groups so that number of radiating elements in the group is nearly constant. Note that only radiating elements will consume RF power, thus making the antenna system power-efficient.

Figure 9:
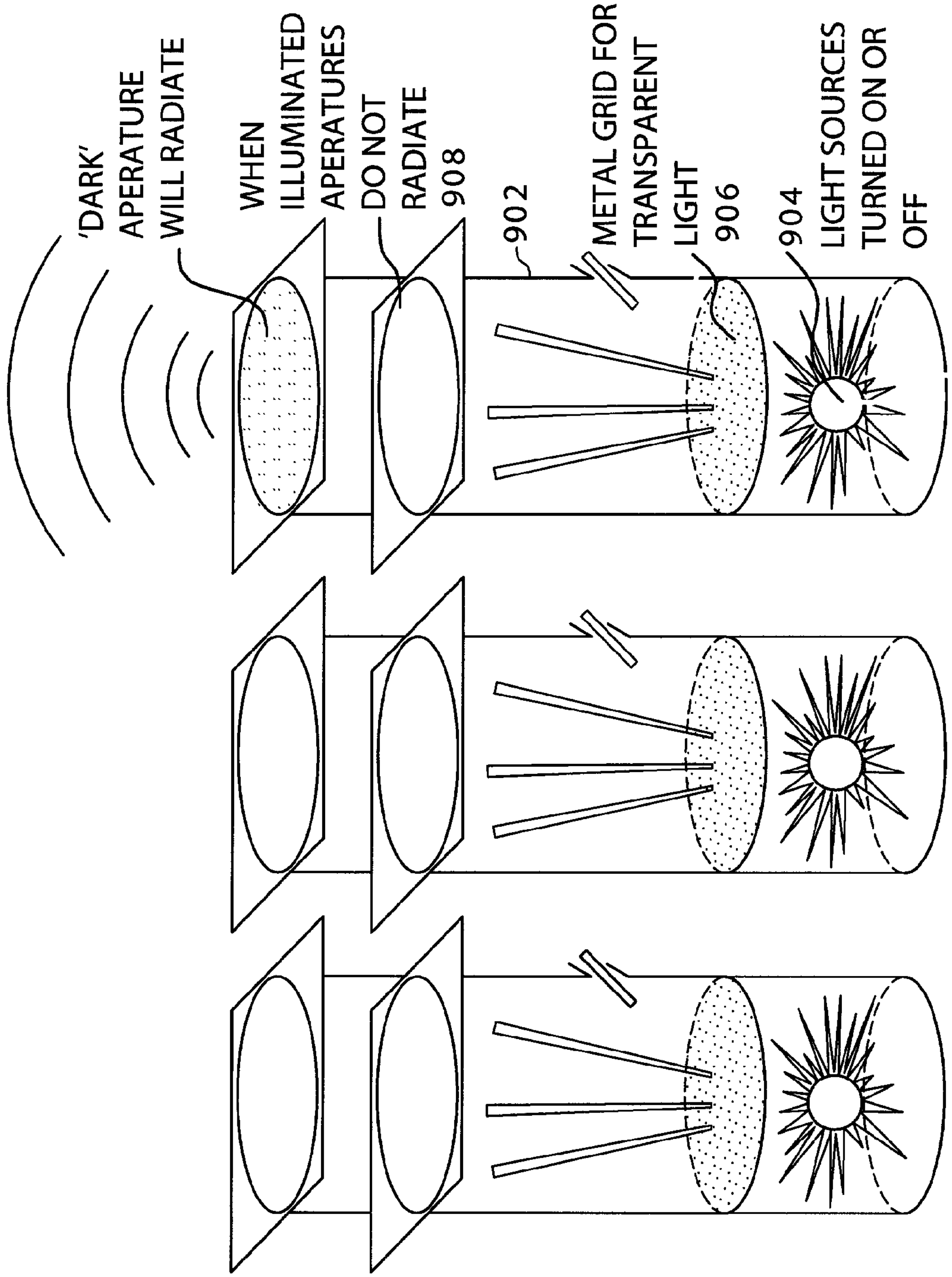
FIG. 9 depicts an array of waveguide antenna elements with optically controlled shutters.

FIG. 9 shows conceptually (disregarding the fabrication method) an enlarged view of a part of the embodiment of the array of waveguide antenna elements that was depicted in FIG. 6 (layers 1 through 7). The ACSs of FIG. 9 are implemented using optically controlled silicon wafers. Sources of light 904 are enclosed in waveguide 902 extensions behind a metal grid 906 that is optically transmissive but that reflects microwave or millimeter wave energy. The switching of radiating waveguides is achieved by switching ON and OFF the light sources.

Thus, embodiments provide a system for facilitating communication between a host device and a peripheral device by controlling an electromagnetic beam direction of an array of antenna elements. An embodiment comprises an array of aperture control shutters (ACSs), with each ACS substantially covering an element of the antenna array. The system also comprises a control mechanism for selecting at least one ACS to allow radiation from the element it covers in order to provide a directed beam to a peripheral device for communication between the host device and the peripheral device. In one embodiment, the ACSs are optically controlled shutters. In another embodiment, the ACSs are electrically biased diodes. Other shutter elements may be known or developed by persons of skill in the art.

In some embodiments, the array of ACSs exhibit an array of impedances that reflect energy in those elements wherein an ACS is closed, and exhibit a radiation resistance in those elements wherein an ACS is open. In some embodiments the control mechanism for selecting ACSs further comprises a logic mechanism to determine a beam's direction based upon which peripheral device is selected for communication with the host device. The control mechanism may therefore also comprise a logic mechanism to determine which ACS to open based upon which peripheral device is selected for communication with the host device. In some embodiments the control mechanism may comprise logic to selectively open multiple ACSs to simultaneously provide multiple beams to multiple peripheral devices.

Figure 10:
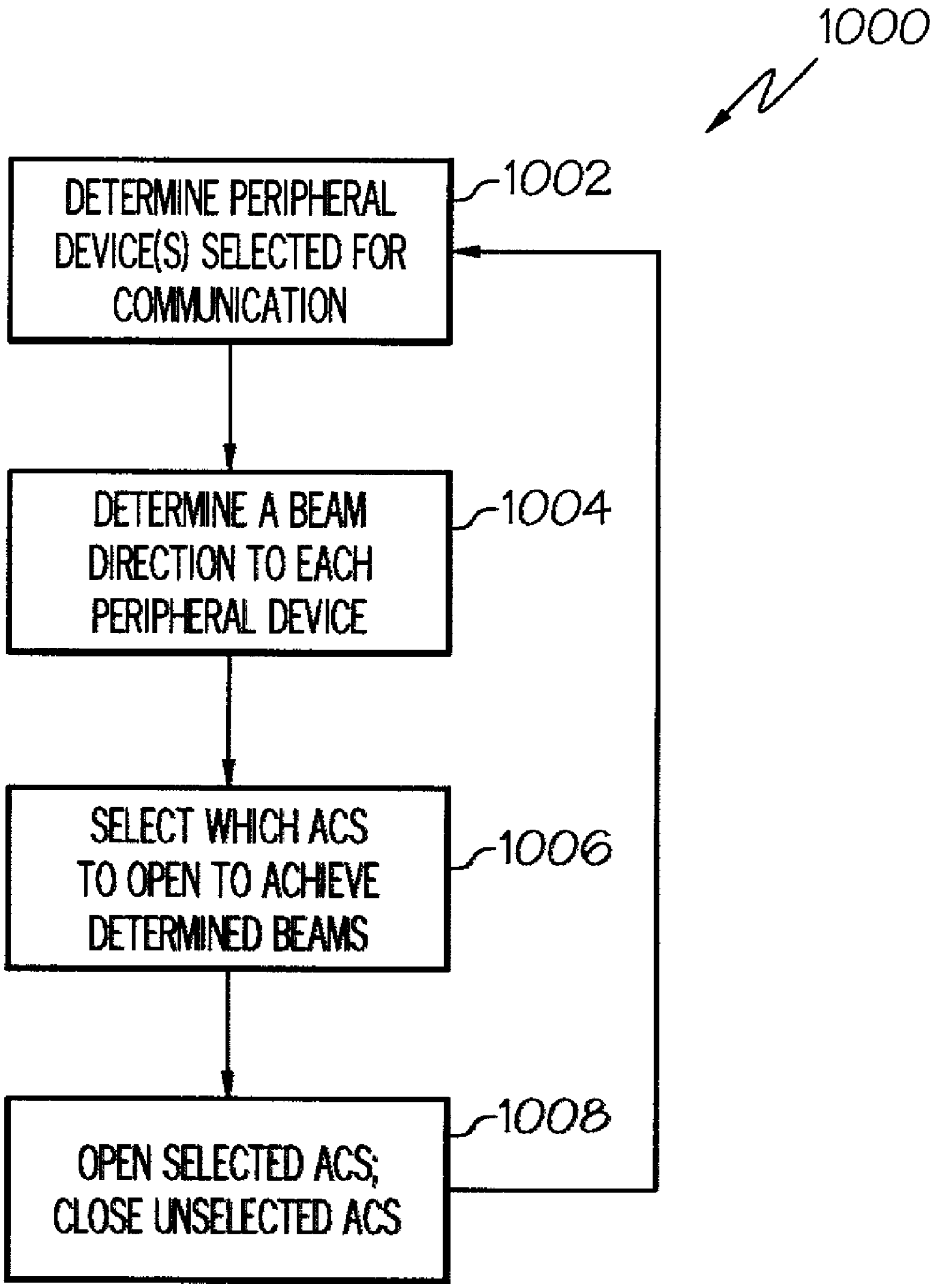
FIG. 10 depicts a flow chart of an embodiment for selecting aperture control shutters.

FIG. 10 shows a functional block diagram 1000 of an embodiment of logic for selectively opening and closing Aperture Control Shutters. This logic may be implemented in software executed by processor 140 and/or other hardware. When processor 140 receives instructions for communicating with a peripheral device, which may be another computer, a printer, a fax machine, or other peripheral device, a determination is made with which peripheral device or devices to communicate (element 1002). For each device, the system determines which beam directions to select for communication with the peripheral device(s) (element 1004). The system then selects which aperture control shutters to be opened to achieve the determined beams (1006). Then, the system opens the selected shutters, while keeping the remaining non-selected shutters closed, thereby producing the desired beam(s) (element 1008).

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for controlling the direction of a beam radiated by an array of antenna elements using aperture control shutters, comprising:

overlaying an array of aperture control shutters (ACSs) on the array of antenna elements, each ACS substantially covering an antenna element, wherein overlaying an array of ACSs comprises overlaying an array of impedances that reflect energy in those elements wherein an ACS is closed, and exhibit a radiation resistance in those elements wherein an ACS is open; and controlling whether an antenna element radiates by controlling whether each individual ACS is open or closed by a signal provided to each ACS.

2. The method of claim 1, wherein overlaying an array of ACSs comprises overlaying an array of optically controlled shutters that close when illuminated and that open when not illuminated by an optical source.

3. The method of claim 1, wherein overlaying an array of ACSs comprises overlaying an array of optically controlled shutters that open when illuminated and that close when not illuminated by an optical source.

4. The method of claim 1, wherein overlaying an array of ACSs comprises overlaying an array of diodes which, when electrically biased in one direction allow radiation, and when biased in an opposite direction, substantially prevent radiation.

5. The method of claim 1, wherein overlaying an array of ACS comprises overlaying an array of gas avalanche tubes, which when a tube is turned on, reflects millimeter wave energy and when the tube is off, passes millimeter wave energy.

6. The method of claim 1, wherein controlling whether each individual ACS is open or closed comprises selecting one or more ACSs to be open while the remainder are closed in order to select a direction of a beam or several beams emitted by the antenna array.

7. The method of claim 1, wherein controlling whether each individual ACS is open or closed comprises determining a device to communicate with, to determine a direction for a beam of the antenna array.

8. A system for facilitating communication between a host device and a peripheral device by controlling an electromagnetic beam direction of an array of antenna elements, comprising:

an array of aperture control shutters (ACSs), each ACS substantially covering an element of the antenna array, wherein the array of ACSs comprises an array of impedances that reflect energy in those elements wherein an ACS is closed, and exhibit a radiation resistance in those elements wherein an ACS is open; and a control mechanism for selecting at least one ACS to allow radiation from the element it covers in order to provide a directed beam to a peripheral device for communication between the host device and the peripheral device.

9. The system of claim 8, wherein the array of ACSs comprise optically controlled shutters.

10. The system of claim 8, wherein the array of ACSs comprise electrically biased diodes.

11. The system of claim 8, wherein the array of ACSs comprise gas avalanche tubes.

12. The system of claim 8, wherein the control mechanism further comprises a logic mechanism to determine a beam's direction based upon which peripheral device is selected for communication with the host device.

13. The system of claim 8, wherein the control mechanism further comprises a logic mechanism to determine which ACS to open based upon which peripheral device is selected for communication with the host device.

14. The system of claim 8, wherein the control mechanism further comprises a logic mechanism to selectively open multiple ACSs to simultaneously provide multiple beams to multiple peripheral devices.

15. A milli-meter (mm) wave antenna system that implements the method of claim 1, wherein the apparatus is formed by layers comprising a printed circuit board, a protective plate with holes for light sources above the printed circuit board, a light transparent metal grid above the protective plate, a second plate with holes, plates comprising the antenna elements above the second plate with holes, and a plate comprising the aperture control shutters above the plates comprising the antenna elements.

16. The method of claim 1, further comprising overlaying lenses over the antenna elements.

* * * * *